United States Patent
Lindoff

(10) Patent No.: US 7,889,801 B2
(45) Date of Patent: Feb. 15, 2011

(54) MULTI TRANSMIT ANTENNA SYNCHRONIZATION CHANNEL TRANSMISSION CELL ID DETECTION

(75) Inventor: Bengt Lindoff, Bjärred (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 652 days.

(21) Appl. No.: 11/862,696

(22) Filed: Sep. 27, 2007

(65) Prior Publication Data

US 2008/0192872 A1 Aug. 14, 2008

Related U.S. Application Data

(60) Provisional application No. 60/889,814, filed on Feb. 14, 2007.

(51) Int. Cl.
*H04K 1/10* (2006.01)
*H04L 27/28* (2006.01)

(52) U.S. Cl. ........................ 375/260; 375/343; 370/209; 370/210

(58) Field of Classification Search ................. 375/260, 375/343; 370/203–211
See application file for complete search history.

(56) References Cited

U.S. PATENT DOCUMENTS

2006/0028976 A1* 2/2006 Park et al. .................... 370/203
2008/0167029 A1* 7/2008 Lindoff et al. ............. 455/422.1

* cited by examiner

*Primary Examiner*—Curtis B Odom
(74) *Attorney, Agent, or Firm*—Roger S. Burleigh

(57) ABSTRACT

A method and apparatus for detecting a cell identification (ID) by determining the number of transmit (TX) antennas used for transmission; applying at least two codes to the reference symbols (RSs) transmitted from the TX antennas, to determine a set of de-coded RSs; in the event it is determined that there is more than one TX antenna used for transmission, grouping the de-coded RSs from the TX antennas and summing the de-coded RSs within the group; equalizing the grouped de-coded RSs; and determining the code of the at least two codes that gives the maximum correlation so as to obtain the cell ID.

17 Claims, 5 Drawing Sheets

MULTI TRANSMIT ANTENNA SYNCHRONIZATION CHANNEL TRANSMISSION CELL ID DETECTION

CROSS-REFERENCE TO RELATED APPLICATIONS

This application claims the benefit of U.S. Provisional Application No. 60/889,814, filed Feb. 14, 2007, the disclosure of which is incorporated herein by reference.

TECHNICAL FIELD

The present invention relates generally to communication systems and, more particularly, to wireless communication systems adapted to use Orthogonal Frequency Division Multiplexing (OFDM) modulation techniques.

BACKGROUND

Evolving mobile cellular standards such as Global System for Mobile Communications (GSM) and Wideband Code Division Multiple Access (WCDMA) will likely require modulation techniques such as OFDM in order to deliver higher data rates. OFDM is a method for multiplexing signals which divides the available bandwidth into a series of frequencies known as sub-carriers.

In order to ensure a smooth migration from existing cellular systems to high capacity, high data rate systems using existing radio spectrum, new systems must be able to operate on a flexible bandwidth (BW). Third generation Long Term Evolution (3G LTE) has been proposed as a new flexible cellular system. 3G LTE is intended as an evolution of the 3G WCDMA standard. 3G LTE will likely use OFDM and operate on BWs spanning from 1.25 MHz to 20 MHz. Data rates of up to 100 Mb/s will be possible in the high BW 3G LTE service.

Low rate services as voice are also expected to use 3G LTE. Because 3G LTE is designed for Transmission Control Protocol/Internal Protocol (TCP/IP), voice over IP (VoIP) will likely be the service carrying speech. An important aspect of 3G LTE is its mobility, hence synchronization symbols and cell search procedures will be important due to the need for the UE to detect and synchronize with cells.

A cell search scheme that has been proposed for 3G LTE is as follows:

1. Detect new cell 5 millisecond (ms) timing using the primary synchronization channel (P-SCH).

2. Detect frame timing and cell group using the secondary synchronization channel (S-SCH). At this step, it is proposed that the number of transmit (TX) antennas used for synchronization channel (SCH) and primary broadcast channel (P-BCH) be detected. As used herein SCH includes, as the context requires, both P-SCH and S-SCH.

3. Detect the cell identification (ID) using the reference symbols (RS) (also referred to as Channel Quality Indicator [CQI] pilots).

Read P-BCH to receive cell specific system information. In step 2 above, the number of TX antennas for SCH and P-BCH transmission is yet to be determined. However, if SCH transmission using multiple TX antenna is implemented, the phase reference obtained from the SCH for equalizing the RSs before cell identification (ID) detection will be based on the sum of the radio channels from all TX antennas. This, in combination with the proposed RS design in 3G LTE, means cell ID detection will be non-trivial. The proposed RS design 100 for 3G LTE is seen in FIG. 1. FIG. 1 shows one resource block having 12 sub-carriers and 14 OFDM symbols, i.e. 1 ms=1 transmission time interval (TTI). As seen therein, the pattern is repetitive in frequency and time. More specifically, FIG. 1 illustrates the RS signal proposal using one virtual antenna 101, two virtual antennas 102 and four virtual antennas 103. In the multiple TX antenna cases 102, 103, the RS transmission from the different antennas are frequency and time multiple. Hence, assuming an RS transmitted from TX antenna i on sub-carrier j at time instant t, no transmission of data or RS are allowed on that position from the other TX antennas. Hence, when the user equipment (UE) uses certain RSs, only channel knowledge for that specific TX antenna is obtained, and hence equalizing using the SCHs as a phase reference, including the sum of the radio channels from all used TX antennas, will be erroneous.

What is desired is a method and apparatus which is adapted to perform robust cell ID detection in case of SCH transmission using multiple TX antennas.

SUMMARY

The present invention groups RSs from multiple TX antennas to those closest to the others in the frequency domain. Then each of the RSs are multiplied with the respective orthogonal codes and the 2 or 4 RSs, depending on the number of TX antennas, nearest to each other in the frequency domain are summed to a single decoded RS. Thereafter, phase equalization, using e.g., a matched filter, is applied and the metric for all orthogonal codes are computed. The code giving the highest metric is identified as the cell ID.

DETAILED DESCRIPTION

Figure 1:
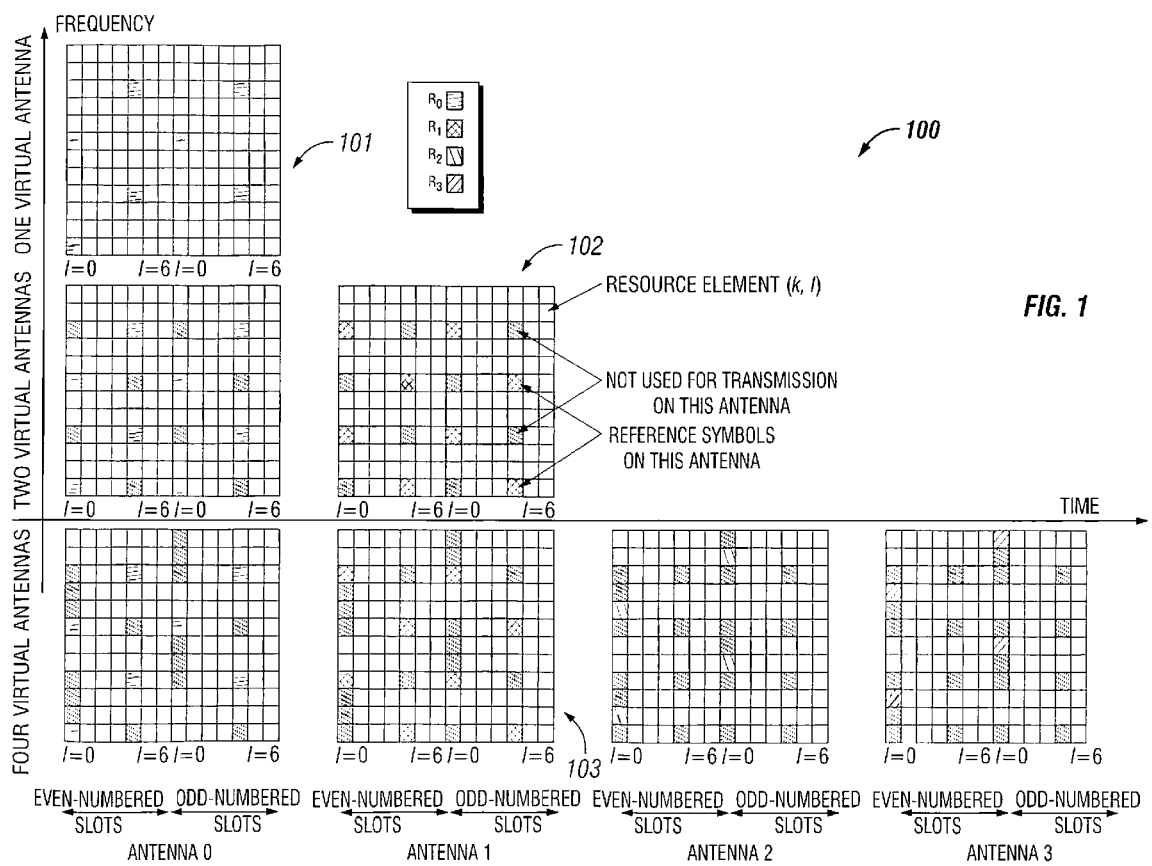
FIG. 1 illustrates a reference symbol (RS) signal for use with 3G LTE in the non-frequency hopping case.

Illustrative embodiments of the present invention are described below. In the interest of clarity, not all features of an actual implementation are described herein. It will be appreciated that in the development of any such actual embodiment, numerous implementation-specific decisions must be made to achieve the inventor's specific goals, such as compliance with system-related constraints which vary from one implementation to another. Moreover, it will be appreciated that such a development effort might be complex and time-consuming, but would nevertheless be a routine undertaking for those of ordinary skill in the art.

The description of the present invention commences with a discussion of the two TX antenna case, and proceeds to a generalization to the 4 TX antenna case. In the description, R is defined as the RSs from the first antenna and S as the RSs from the second antenna. In step 3 of the cell search scheme proposed for 3G LTE (step 3 being: detect the cell ID using the RS), the received signal for time position t and t+4 and sub-carrier i, i=1, ..., N, (where we assume there is an RS transmitted) is written as:

$$Y_{t,i}=H_i^1 R_{t,i,k}+E_{t,i}$$

$$Y_{t+4,i}=H_i^2 S_{t+4,i,k}+E_{t+4,i} \quad (1)$$

where R, S are the RSs from the first and second TX antenna, respectively. The index k represent the orthogonal RS codes that describe the Cell ID.

In 3G LTE, 3 cell IDs (orthogonal codes) are proposed. The code definition is:

$$S = R = \begin{pmatrix} R_{0,0} & R_{0,1} \\ R_{1,0} & R_{1,1} \\ R_{2,0} & R_{2,1} \end{pmatrix} = \left[ \begin{pmatrix} 1 & 1 \\ 1 & 1 \\ 1 & 1 \end{pmatrix} \cdot \begin{pmatrix} 1 & y \\ x & 1 \\ y & x \end{pmatrix}, \begin{pmatrix} 1 & x \\ y & 1 \\ x & y \end{pmatrix} \right]$$

$$x = e^{j2\pi/3}, y = e^{j4\pi/3}$$

As a phase reference, the synchronization signals (P/S-SCH) could be used to equalize the channels. $\hat{H}1$ is the channel from TX antenna 1 and $\hat{H}2$ channel is from TX antenna 2. Since the SCHs are transmitted by two TX antennas the channel estimate for sub-carrier i is:

$$\hat{H}_i=H_i^1+H_i^2$$

which is the sum of the two radio channels.

Therefore, before equalization and correlation, the following steps need to be performed. First the RSs need to be grouped, that is each RS from the different antennas transmitted on the same carrier should define an RS group, as in equation (1) above.

Second, the orthogonal codes should be applied to the respective RSs as follows:

$$D_{1,i,l}=Y_{t,i} R_{i,l}^*$$

$$D_{2,i,l}=Y_{t+4,i} S_{j,l}^*, l=1, 2, \ldots, N \quad (2)$$

Third, they should be summed as follows:

$$D_{i,l}=D_{1,i,l}+D_{2,i,l}, l=1, 2, \ldots, N. \quad (3)$$

Finally, equalization, using e.g., a matched filter approach, is performed and correlation is carried out over N grouped RSs as follows:

$$Q_l = \left| \sum_{i=1}^{N} \frac{D_{i,l}}{\hat{H}_i} \right|^2, \text{equalization} \quad (4)$$

$$Q_l = \left| \sum_{i=1}^{N} \hat{H}_i^* D_{i,l} \right|^2, \text{matched filter}, l = 1, 2, \ldots, N$$

The cell ID within the cell group is determined as the index l giving the highest metric. In 3G LTE the RSs could also be frequency hopping (FH). This could be signaled, among other methods, in step 2 of the cell search or blindly detected in step 3 of the cell search (step 2 being: detect frame timing and cell group using the S-SCH; and step 3 being: detect the cell ID using the RS).

Figure 2:
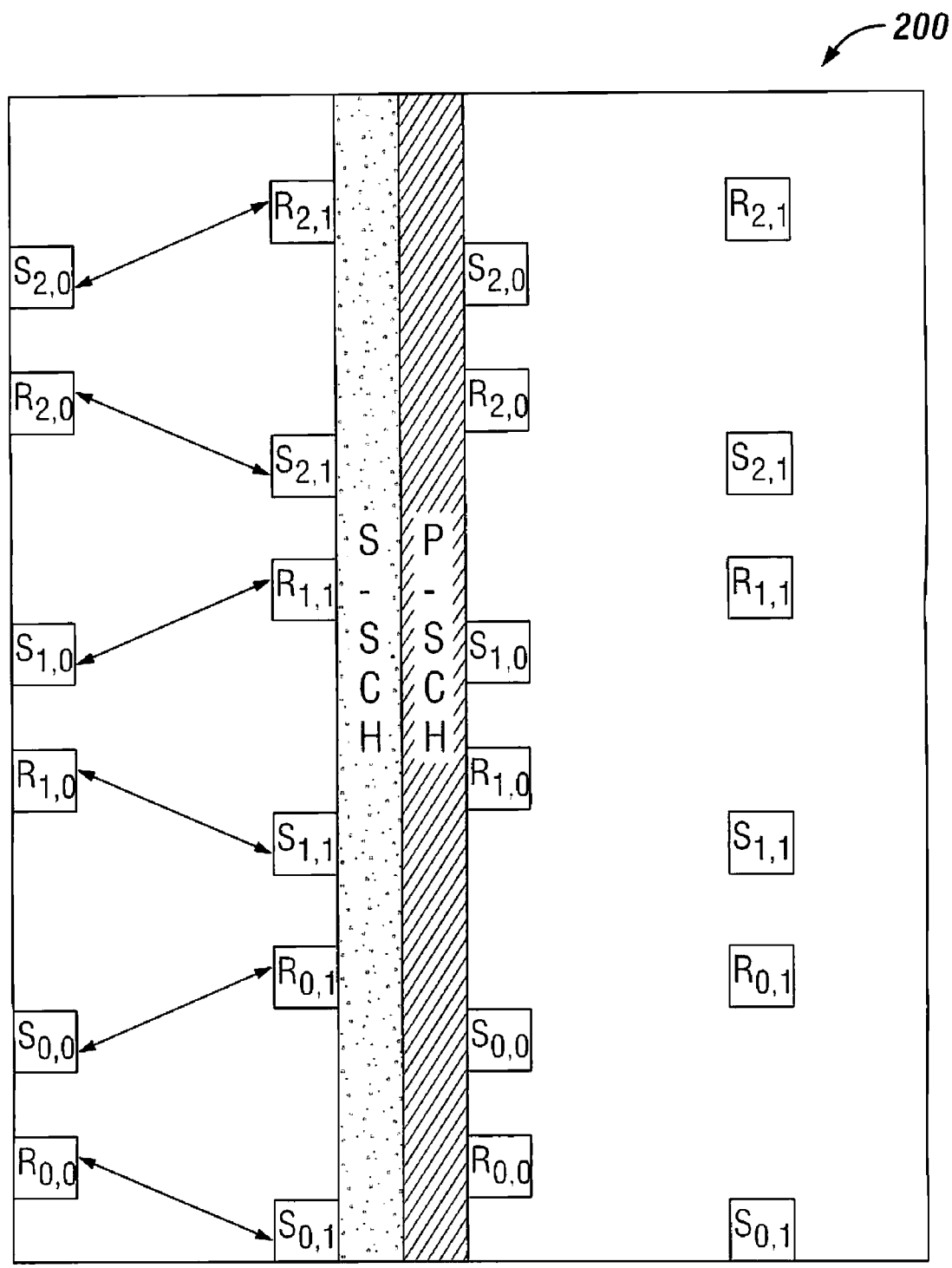
FIG. 2 illustrates a grouping of RSs for different transmit (TX) antennas in an embodiment of the present invention using 2 TX antennas.

The hopping pattern is however determined from the cell group, hence having detected the cell group, the position in each slot is well defined in the FH case. However, in the described embodiments of the present invention, the RSs from the different TX antennas are not necessarily placed at the same sub-carriers as seen in FIG. 2. FIG. 2 illustrates a grouping 200 of RSs for different TX antennas in an embodiment of the present invention using 2 TX antennas. In order to overcome that the RSs from the different TX antennas are not necessarily placed at the same sub-carriers, the RS group is defined as the two RSs from antenna 1 and 2 which are nearest to each other in the frequency domain. The arrows in FIG. 2 show how the RS groups could be defined. In order to determine the channel estimate used for equalization, a weighted sum of the channel estimate for sub-carrier i (RS for antenna 1) and j (RS for antenna 2) could be used as follows:

$$\hat{H}_{i,j}^{cellID}=\alpha_1 \hat{H}_i^* + \alpha_2 \hat{H}_j^*. \quad (5)$$

For example, the weight factors could be, but are not limited to being, chosen as $\alpha 1=\alpha 2=0.5$. Once the RS groups have been determined and the cell ID channel estimate computed, the detection approach is the same as described above.

Figure 3:
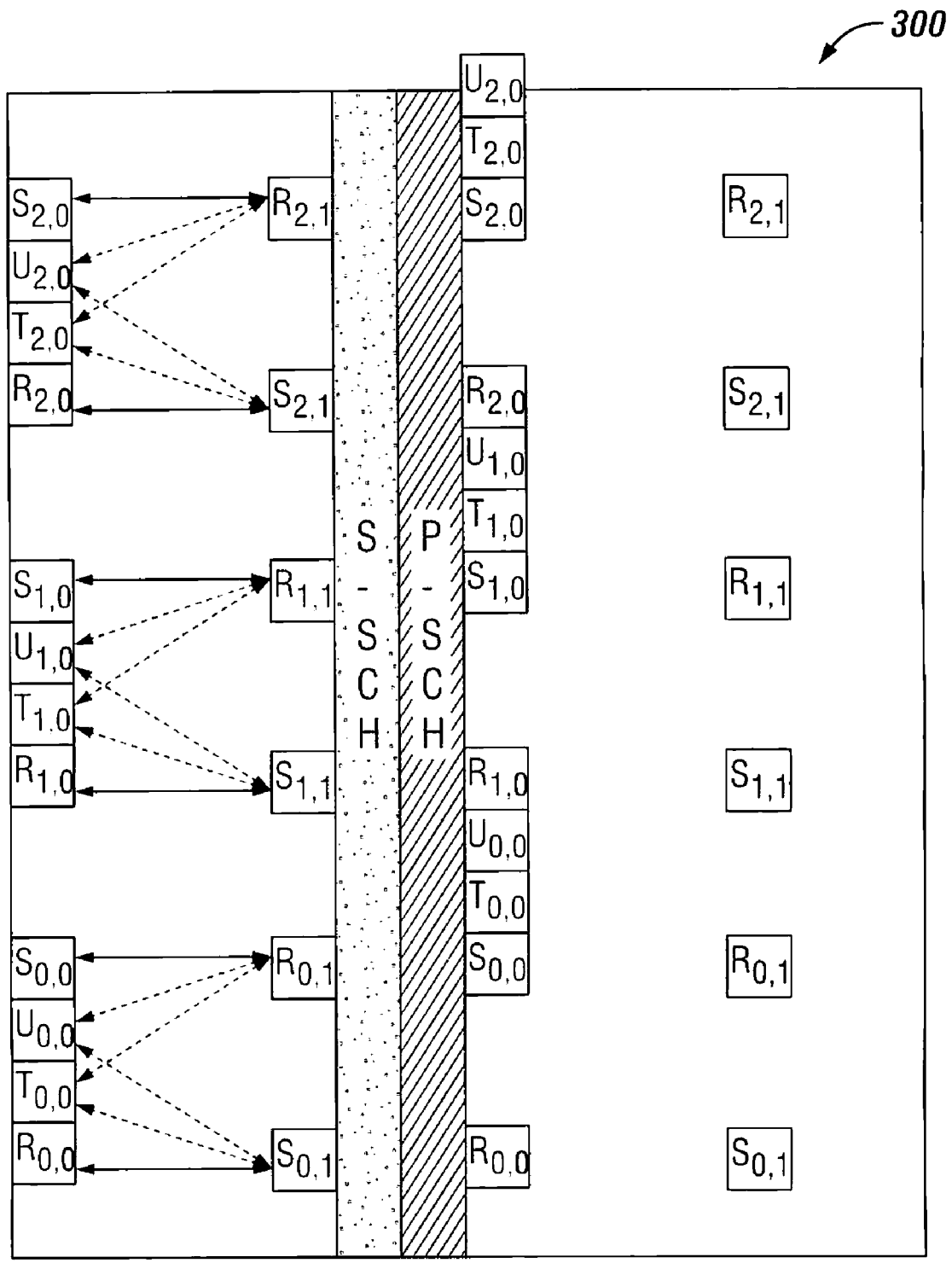
FIG. 3 illustrates the grouping of RSs where there are 4 TX antennas in an embodiment of the present invention.

The four (4) TX antenna case is treated in a somewhat different way. Since the RS density from TX antenna 3 and TX antenna 4 is only half of the RS from TX antenna 1 and TX antenna 2, the RSs from the third and fourth TX antenna need to be used for two sub-carriers. The RS groups in the 4 TX antenna case 300 is seen in FIG. 3. As seen therein, the RSs for TX antenna 3 and TX antenna 4 is labeled T and U respectively, as follows:

$$S, T, U = R = \begin{pmatrix} R_{0,0} & R_{0,1} \\ R_{1,0} & R_{1,1} \\ R_{2,0} & R_{2,1} \end{pmatrix} = \left[ \begin{pmatrix} 1 & 1 \\ 1 & 1 \\ 1 & 1 \end{pmatrix} \cdot \begin{pmatrix} 1 & y \\ x & 1 \\ y & x \end{pmatrix}, \begin{pmatrix} 1 & x \\ y & 1 \\ x & y \end{pmatrix} \right]$$

$$x = e^{j2\pi/3}, y = e^{j4\pi/3}$$

The channel estimate used in the cell ID detection could be determined in a similar way as described in the two TX antenna case above. $\hat{H}_1$ is the channel from TX antenna 1, $\hat{H}_2$ channel is from TX antenna 2, $\hat{H}_3$ channel is from TX antenna 3, and $\hat{H}_4$ channel is from TX antenna 4. That is, assuming i, j, k and l determine the sub-carrier for RSs from TX antenna 1, 2, 3, and 4, respectively, the channel estimate used for cell ID detection is determined as follows:

$$\hat{H}_{i,j,k,l}^{cellID}=\alpha_1 \hat{H}_i^* + \alpha_2 \hat{H}_j^* \alpha_3 \hat{H}_k^* + \alpha_4 \hat{H}_l^* \quad (6)$$

Once the groups are determined, the detection is done as described above.

Figure 4:
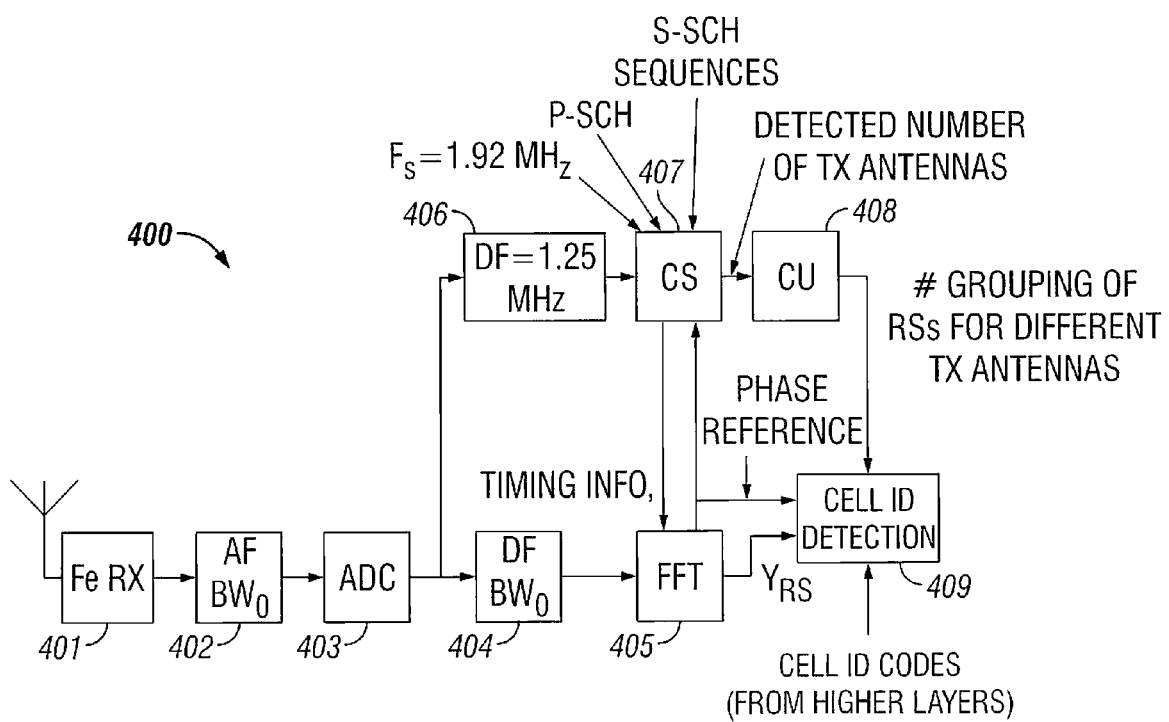
FIG. 4 is a block diagram of an embodiment of the present invention.

FIG. 4 is a block diagram 400 of an embodiment of the present invention. With reference to FIG. 4, the UE 400 is performing a cell search. The signal is received and down-converted to a baseband signal in the front end receiver (Fe RX) 401. The signal BW is filtered at filter 402 and converted at analog to digital converter (ADC) 403 from an analog signal to a digital signal. The signal is then digitally filtered at first digital filter 405 and fed to the Fast Fourier transform (FFT) unit 405. The signal output from the ADC is also fed to a second, smaller, digital filter 406 adapted to filter out the SCH bandwidth (BW) (here 1.25 MHz is shown which is assumed to be the LTE SCH BW). The filtered signal is then fed to the cell search unit 407 that performs the cell search P-SCH and S-SCH detection. The timing information, obtained in the P-SCH detection stage, is fed from the cell search unit 407 to the FFT 405. The S-SCH detection is performed using P-SCH timing and frequency information. The detected S-SCH is used as a phase reference in a cell ID detection unit. The detected number of TX antennas used for SCH and P-BCH transmission is fed to control unit 408 which, based on the TX antenna number, performs RS grouping as hereinabove described. That information is fed to the cell ID detection unit 409 that then performs the cell ID detection by correlating the phase equalized RS samples to the orthogonal cell ID codes. The output from the cell ID detection unit 409 is the cell ID.

Figure 5:
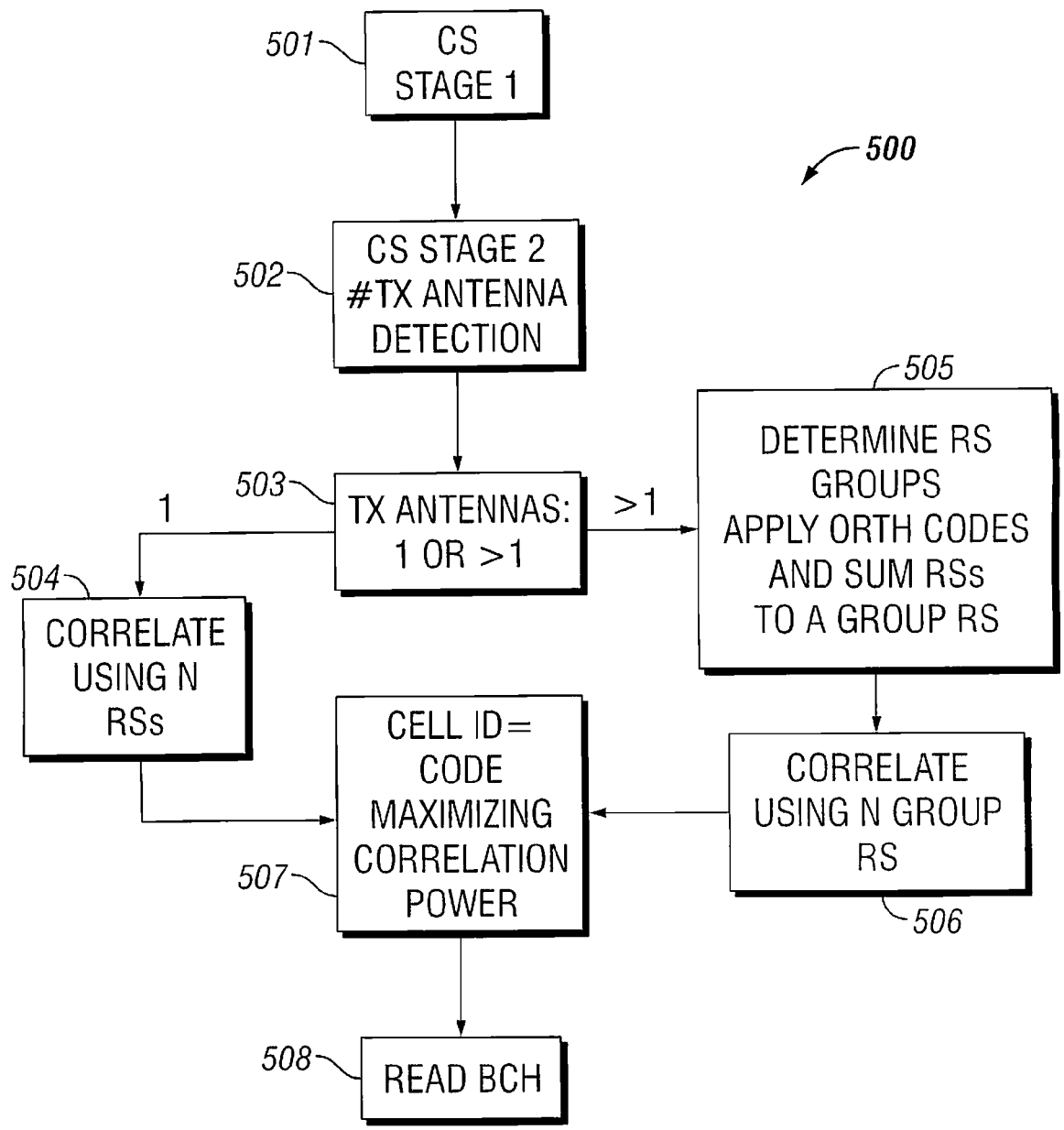
FIG. 5 is a flow chart of an embodiment of the present invention.

A flow chart 500 of an embodiment of the present invention is seen in FIG. 5. As seen therein, in step 501, the UE performs a cell search to find a predetermined timing, e.g., 5 millisecond, and the P-SCH sequence. In step 502, the number of TX antennas used for SCH and P-BCH is detected. In step 503, a control unit determines the number of TX antennas used. If the number of TX antennas is 1, then in step 504, a correlation to the received RSs is conventionally performed, that is correlated the RS sequence (length N) from TX antenna 1 to the orthogonal cell ID codes and then in step 507, the cell ID code maximizing correlation power is determined, and in step 508, the P-BCH is read. If, in step 503, more than 1 TX antenna is detected, then, in step 505, the RS groups are determined, orthogonal codes are applied to the RSs and the RSs are summed to determine the group RS. Then, in step 506, the N group RS are correlated to the orthogonal cell ID codes. In step 507, the cell ID code maximizing correlation power is determined, and in step 508, the P-BCH is read.

Those skilled in the art will appreciate that the various steps, routines or units illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more computer readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape, and optical media such as compact discs (CDs) or digital versatile discs (DVDs). Instructions that make up the various software layers, routines, or units in the various systems may be stored in respective storage devices. The instructions, when executed by a respective control unit, cause the corresponding system to perform programmed acts.

The innovative concepts described in the present application can be modified and varied over a wide range of applications. Accordingly, the scope of patented subject matter should not be limited to any of the specific exemplary teachings discussed above.

What is claimed:

1. A method for detecting a cell identification (ID), comprising the steps of:
   determining the number of transmit (TX) antennas used for transmission;
   applying at least two codes to the reference symbols (RSs) transmitted from the transmit antennas, to determine a set of de-coded RSs;
   in the event it is determined that there is more than one TX antenna used for transmission, grouping the de-coded RSs from the TX antennas and summing the de-coded RSs within the group;
   equalizing the grouped de-coded RSs; and,
   determining the code of the at least two codes that gives the maximum correlation so as to obtain the cell ID.

2. The method of claim 1, wherein the codes are orthogonal codes.

3. The method of claim 2, wherein the number of TX antennas used for transmission is four (4).

4. The method of claim 1, wherein the equalizing step is performed using a primary synchronization channel (P-SCH) and secondary synchronization channel (S-SCH).

5. The method of claim 1, wherein the equalizing step is performed using a primary synchronization channel (P-SCH) or a secondary synchronization channel (S-SCH).

6. The method of claim 1, wherein the group is defined as the RSs from the TX antennas which are nearest to each other in the frequency domain.

7. The method of claim 1, implemented in a Third Generation Long Term Evolution (3G LTE) system.

8. The method of claim 2, wherein the number of TX antennas used for transmission is two (2) and further comprising the step of determining a channel estimate ($\hat{H}$) used for equalization by using a weighted sum of the channel estimates for sub-carrier i (RS for antenna 1) and j (RS for antenna 2) as follows:
$\hat{H}_{i,j}^{cellID} = \alpha_1 \hat{H}_i^* + \alpha_2 \hat{H}_j^*$, wherein $\alpha_1$ and $\alpha_2$ are weight factors having a sum of 1.

9. A method for multi-transmit (TX) antenna synchronization channel transmission cell identification (ID) comprising the steps of:
   performing, by a user equipment (UE) a cell search to find a predetermined timing and primary synchronization channel (P-SCH) sequence;
   detecting a number of TX antennas used for receiving a synchronization channel (SCH) and primary broadcast control channel (P-BCH);
   determining, by a control unit, the number of transmit (TX) antennas used;
   if the number of TX antennas detected is 1, then conventionally performing a correlation to the received RSs;
   if the number of TX antennas detected is more than 1, then:
      determining reference symbol (RS) groups by applying orthogonal codes to the RSs and summing the RSs to determine the group RS;
      correlating the N group RS to the orthogonal cell ID codes;
      determining the cell ID code maximizing correlation power; and,
      reading the P-BCH.

10. The method of claim 9, wherein the group is defined as the RSs from the TX antennas which are nearest to each other in the frequency domain.

11. The method of claim 9, implemented in a Third Generation Long Term Evolution (3G LTE) system.

12. An apparatus for multi-transmit antenna synchronization channel transmission cell identification (ID), comprising:
   a front end receiver (Fe RX) adapted to receive a signal from an antenna;
   an analog filter adapted to filter a signal bandwidth (BW) coupled to an output of the Fe RX;
   an analog to digital converter (ADC) coupled to the output of the analog filter and adapted to convert an analog signal to a digital signal;
   a first digital filter adapted to receive and digitally filter the digital signal from the ADC;
   a Fast Fourier transform (FFT) unit adapted to receive the digital signal filtered by the first digital filter;
   a second, smaller, digital filter adapted to receive the digital signal from the ADC and adapted to filter out the synchronization channel (SCH) BW;

a cell search unit adapted to receive the digital signal filtered by the second, smaller, digital filter, the cell search unit adapted to perform primary synchronization channel (P-SCH) and secondary synchronization channel (S-SCH) detection, wherein the detected S-SCH is used as a phase reference in a cell ID detection unit;

a Fast Fourier Transform (FFT) unit adapted to receive timing information obtained in the P-SCH detection stage from the cell search unit;

a control unit adapted to receive the detected number of TX antennas used for synchronization channel (SCH) and primary broadcast control channel (P-BCH) transmission from the cell search unit, said control unit adapted to perform reference symbol (RS) grouping; and a cell identification (ID) detection unit adapted to receive the information necessary to correlate phase equalized RS samples to orthogonal cell ID codes and output the cell ID.

13. The apparatus of claim 12, wherein the second, smaller, digital filter adapted to filter out the SCH BW has a of 1.25 MHz.

14. The apparatus of claim 12, wherein the S-SCH detection in the cell search unit is performed using P-SCH timing and frequency information.

15. The apparatus of claim 12, implemented in a Third Generation Long Term Evolution (3G LTE) system.

16. A computer software program embodied on a non-transitory computer readable medium adapted to be executed by computer hardware, comprising program code adapted to:
perform a cell search to find a predetermined timing and primary synchronization channel (P-SCH) sequence;
detect a number of TX antennas used for receiving a synchronization channel (SCH) and primary broadcast control channel (P-BCH);
determine the number of transmit (TX) antennas used;
if the number of TX antennas detected is 1, then conventionally perform a correlation to the received reference symbols (RSs);
if the number of TX antennas detected is more than 1, then:
determine RS groups by applying orthogonal codes to the RSs and summing the RSs to determine the group RS;
correlate the N group RS to the orthogonal cell ID codes;
determine the cell ID code maximizing correlation power; and
read the P-BCH.

17. The computer software program of claim 16, adapted to be implemented in a Third Generation Long Term Evolution (3G LTE) system.

* * * * *

UNITED STATES PATENT AND TRADEMARK OFFICE
CERTIFICATE OF CORRECTION

PATENT NO. : 7,889,801 B2
APPLICATION NO. : 11/862696
DATED : February 15, 2011
INVENTOR(S) : Lindoff It is certified that error appears in the above-identified patent and that said Letters Patent is hereby corrected as shown below:

In Column 3, Lines 15-17, delete "$S = R = \begin{pmatrix} R_{0,0} & R_{0,1} \\ R_{1,0} & R_{1,1} \\ R_{2,0} & R_{2,1} \end{pmatrix} = \left[ \begin{pmatrix} 1 & 1 \\ 1 & 1 \\ 1 & 1 \end{pmatrix} \cdot \begin{pmatrix} 1 & y \\ x & 1 \\ y & x \end{pmatrix} \cdot \begin{pmatrix} 1 & x \\ y & 1 \\ x & y \end{pmatrix} \right]$ $x = e^{j2\pi/3}, y = e^{j4\pi/3}$" and insert -- $S = R = \begin{pmatrix} R_{0,0} & R_{0,1} \\ R_{1,0} & R_{1,1} \\ R_{2,0} & R_{2,1} \end{pmatrix} = \left[ \begin{pmatrix} 1 & 1 \\ 1 & 1 \\ 1 & 1 \end{pmatrix} \cdot \begin{pmatrix} 1 & y \\ x & 1 \\ y & x \end{pmatrix} \cdot \begin{pmatrix} 1 & x \\ y & 1 \\ x & y \end{pmatrix} \right]$ $x = e^{j2\pi/3}, y = e^{j4\pi/3}$ --, therefor.

In Column 3, Line 38, delete "$D_{2,i,l} = Y_{l+4,i} S_{i,l}^{*}, l = 1, 2, \ldots, N^{l}$" and insert -- $D_{2,i,l} = Y_{l+4,i} S_{i,l}^{*}, l = 1, 2, \ldots, N^{l}$ --, therefor.

In Column 4, Line 15, delete "α1=α2=0.5." and insert -- $\alpha_1 = \alpha_2 = 0.5$. --, therefor.

In Column 4, Lines 29-33, delete "$S, T, U = R = \begin{pmatrix} R_{0,0} & R_{0,1} \\ R_{1,0} & R_{1,1} \\ R_{2,0} & R_{2,1} \end{pmatrix} = \left[ \begin{pmatrix} 1 & 1 \\ 1 & 1 \\ 1 & 1 \end{pmatrix} \cdot \begin{pmatrix} 1 & y \\ x & 1 \\ y & x \end{pmatrix} \cdot \begin{pmatrix} 1 & x \\ y & 1 \\ x & y \end{pmatrix} \right]$ $x = e^{j2\pi/3}, y = e^{j4\pi/3}$" and insert -- $S, T, U = R = \begin{pmatrix} R_{0,0} & R_{0,1} \\ R_{1,0} & R_{1,1} \\ R_{2,0} & R_{2,1} \end{pmatrix} = \left[ \begin{pmatrix} 1 & 1 \\ 1 & 1 \\ 1 & 1 \end{pmatrix} \cdot \begin{pmatrix} 1 & y \\ x & 1 \\ y & x \end{pmatrix} \cdot \begin{pmatrix} 1 & x \\ y & 1 \\ x & y \end{pmatrix} \right]$ $x = e^{j2\pi/3}, y = e^{j4\pi/3}$ --, therefor.

In Column 7, Line 14, in Claim 12, delete "and" and insert -- and, -- therefor.

In Column 7, Line 21, in Claim 13, after "a" insert -- [BW passband] --.

Signed and Sealed this
Third Day of May, 2011

David J. Kappos
*Director of the United States Patent and Trademark Office*